M. UNGER.
ELECTRICAL SYSTEM OF POWER TRANSMISSION.
APPLICATION FILED NOV. 15, 1918.
1,350,899.
Patented Aug. 24, 1920.
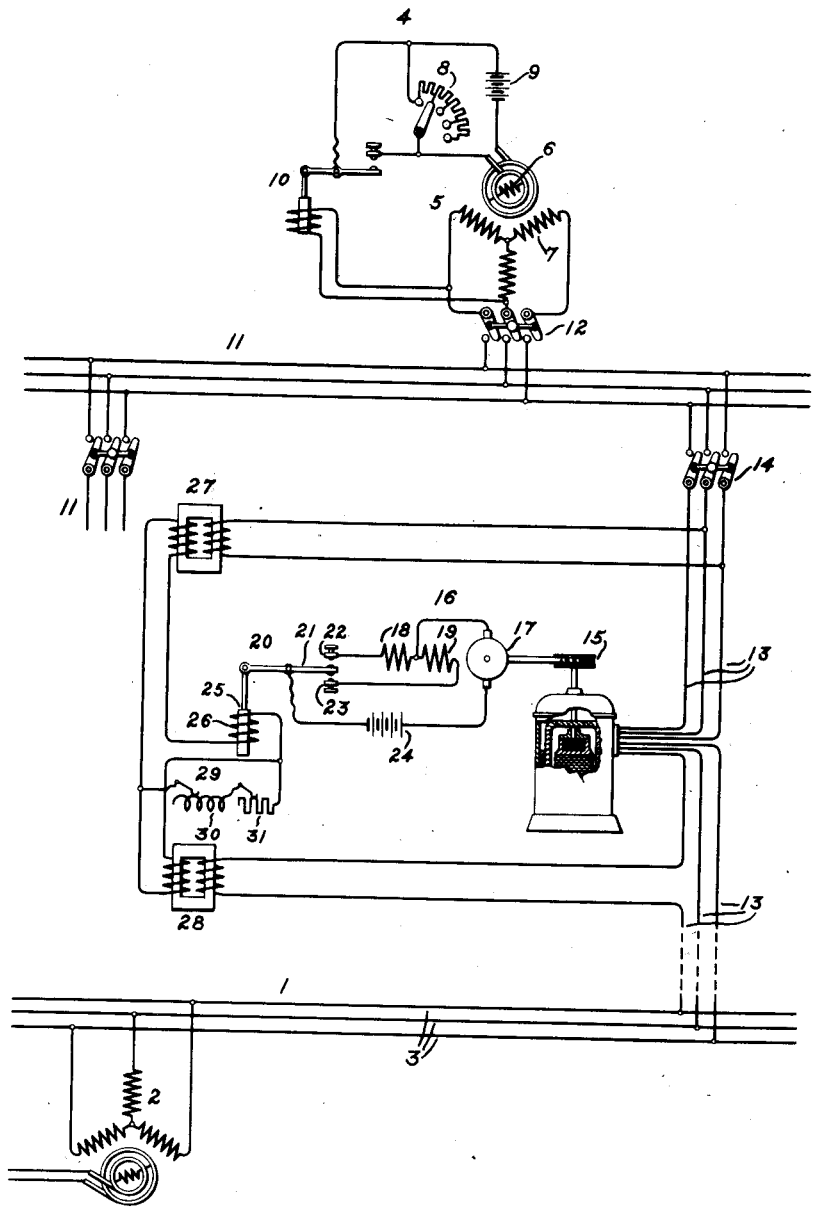
Inventor:
Magnus Unger,
by Albert E. Davis
His Attorney.

UNITED STATES PATENT OFFICE.

MAGNUS UNGER, OF PITTSFIELD, MASSACHUSETTS, ASSIGNOR TO GENERAL ELECTRIC COMPANY, A CORPORATION OF NEW YORK.

ELECTRICAL SYSTEM OF POWER TRANSMISSION.

1,350,899. Specification of Letters Patent. Patented Aug. 24, 1920.

Application filed November 15, 1918. Serial No. 262,741.

*To all whom it may concern:*

Be it known that I, MAGNUS UNGER, a citizen of the United States, residing at Pittsfield, county of Berkshire, State of Massachusetts, have invented certain new and useful Improvements in Electrical Systems of Power Transmission, of which the following is a specification.

My invention relates to electrical systems of power transmission and particularly to electrical systems of power transmission comprising main and supplemental sources of alternating current and a distribution circuit supplied thereby.

In systems of the kind referred to, it is often desirable to maintain the power factor of the load imposed upon one of the sources such as the main source by the distribution circuit approximately constant or within narrow limits. This is particularly likely to be the case where the energy supplied to the distribution circuit by the source is purchased at a rate depending upon the power factor. The object of my invention, therefore, is to provide, in a transmission system of the kind referred to, new and improved means for regulating the power factor of the load imposed upon one of the sources of alternating current by the distribution circuit. To this end I interpose voltage modifying means between one of the sources of alternating current and the distribution circuit and provide power factor responsive means for regulating the voltage modifying means to control the power factor of the load imposed upon one of the sources.

My invention may best be understood by reference to the following description taken in connection with the accompanying drawing, while the scope of my invention is defined in the claims appended hereto.

Referring to the drawing, in the single figure of which is diagrammatically shown a system embodying one modification of my invention, 1 denotes a main source of alternating current comprising an alternator 2 and supply mains 3. 4 denotes a supplemental source of alternating current comprising an alternator 5, having a field winding 6 and an armature winding 7. The field winding 6 is connected in series with a resistance 8 to a source of direct current 9. The voltage developed in the armature winding 7 is controlled by means of a regulator 10 which varies the effectiveness of resistance 8. 11 denotes a distribution circuit to which the auxiliary source is adapted to be connected by means of a switch 12 and to which the main source is adapted to be connected by means of conductors 13 and a switch 14. 15 denotes an induction type regulator, which is interposed in the conductors 13 and is preferably arranged to buck or boost the voltage therein. The regulator 15 is actuated by a reversible motor 16 which is provided with an armature 17 and with field windings 18 and 19. 20 denotes a contact making voltmeter comprising a contact lever 21 and stationary contacts 22 and 23. One side of the armature 17 is electrically connected, in series with a source of current 24, to the contact lever 21, while the other side thereof is connected to one terminal of each of the windings 18 and 19, the other terminals of the windings 18 and 19 being connected to the stationary contacts 22 and 23 respectively. The contact lever 21 is actuated by means of a core 25 and an operating winding 26. 27 denotes a potential transformer having a primary winding connected across the first and second phases of the conductors 13, and 28 denotes a current transformer having a primary winding connected in series with the third phase of the conductors 13. The potential transformer 27 is connected intermediate the regulator 15 and the distribution circuit 11, while the current transformer 28 is connected intermediate the supply lines 3 and the regulator 15. The operating winding 26 of the contact making voltmeter 20 is connected in circuit with the secondary winding of the potential transformer 27 and with the secondary winding of the series transformer 28. A circuit portion 29, comprising an adjustable reactance 30 and an adjustable resistance 31, is connected in shunt to the secondary of the series transformer 28.

It will be understood that, when the main source 1 and the supplemental source 4 are operating in parallel to supply current to the distribution circuit 11, and the regulator 10 is operating to maintain the voltage impressed upon the distribution circuit 11 by the supplemental source 4 approximately constant, the power factor of the load imposed upon the main source may be maintained uniform notwithstanding variations in the power factor of the distribution circuit load by the actuation of the regulator 15. If the regulator 15 be operated in a direction to decrease the voltage on the distribution circuit side thereof, the portion of the lagging current of the distribution circuit load which is supplied by the main source will be decreased, whereas, if the regulator 15 be operated in a direction to increase the voltage of the distribution circuit side thereof, the portion of the lagging current of the distribution circuit load supplied by the main source may be increased. The regulator 15 is operated in response to variations from a predetermined value in the power factor of the load imposed upon the main source by the distribution circuit by means of the motor 16, the contact making voltmeter 20 and the parts coöperating therewith. The voltmeter 20 is preferably designed and adjusted to operate in response to variations of one volt above or below the mean value of the voltage applied to the operating winding 26 thereof. The adjustable reactance 30 and resistance 31 are adjusted so that for the power factor of the distribution circuit load on the main source 1, which it is desired to maintain, the vectorial sum of the voltage in the secondary winding of the potential transformer 27 and of the voltage across the circuit portion 29 will have such a value that the contact lever of the voltmeter 20 will occupy the position illustrated, or in other words, the vectorial sum under these conditions will equal the mean value of the voltage impressed upon the operating winding 26 hereinbefore referred to. If the power factor of the load, imposed upon the main source 1 by the distribution circuit 11, decreases, the voltage impressed upon the operating winding 26 of the contact making voltmeter 20 will be increased, thereby effecting engagement between the contact lever 21 and stationary contact 23 and causing the operation of the induction regulator 15 to decrease the voltage on the distribution circuit side thereof until the power factor is restored to the desired value. Similarly, if the power factor of the load, imposed upon the main source 1, increases, the voltage impressed upon the operating winding 26 will be decreased, thereby effecting engagement between the contact lever 21 and stationary contact 22 and causing the operation of the induction regulator 15 to increase the voltage on the distribution circuit side thereof until the desired power factor is restored. Since the operation of the system depends to some extent upon the value of the current in the conductors 13, the system will preferably be adjusted to maintain the power factor within certain desired limits when the value of the current therein corresponds to normal full load. As the load falls off the limits between which the power factor is maintained widen somewhat but this is not objectionable. Furthermore, if the system be adjusted to maintain unity power factor at normal full load, the effect upon the limits between which the system maintains the power factor is less marked with variations in load. It will thus be seen that I have provided, in a system of the kind referred to, automatic means for regulating the power factor of the load imposed upon the main source of alternating current by a distribution circuit, which at the same time permits of automatic voltage regulation of the supplemental source and hence of the maintenance of a substantially uniform voltage upon the distribution circuit.

While I have herein shown and described one modification of my invention, I do not desire to be limited to the exact arrangement shown and described but seek to cover in the appended claims all those modifications which come within the true spirit and scope of my invention.

What I claim as new and desire to secure by Letters Patent of the United States, is—

1. The combination with a plurality of sources of alternating current, of a distribution circuit supplied thereby, voltage modifying means interposed between one of said sources and said circuit, and power factor responsive means for regulating said voltage modifying means to control the power factor of the load imposed upon one of said sources.

2. The combination with main and supplemental sources of alternating current, of a distribution circuit supplied thereby, voltage modifying means interposed between one of said sources and said circuit, and power factor responsive means for regulating said voltage modifying means to control the power factor of the load imposed upon the source between which and the distribution circuit the voltage modifying means are interposed.

3. The combination with main and supplemental sources of alternating current, of a distribution circuit supplied thereby, voltage modifying means interposed between said main source and said circuit, and power factor responsive means for regulating said voltage modifying means to control the power factor of the load imposed upon said main source.

4. The combination with main and supplemental sources of alternating current, of a distribution circuit supplied thereby, voltage modifying means interposed between said main source and said circuit, power factor responsive means for regulating said voltage modifying means to control the power factor of the load imposed upon said main source, and automatic means for regulating the voltage of said supplemental source.

5. The combination with main and supplemental sources of alternating current, of a distribution circuit supplied thereby, a transformer interposed between said main source and said circuit, and power factor responsive means for varying the operation of said transformer to control the power factor of the load imposed upon said main source.

6. The combination with main and supplemental sources of alternating current, of a distribution circuit supplied thereby, an induction regulator interposed between said main source and said circuit, and power factor responsive means for controlling said induction regulator to control the power factor of the load imposed upon said main source.

In witness whereof I have hereunto set my hand this 12th day of November, 1918.

MAGNUS UNGER.